July 26, 1932.　　　A. E. DAVIDSON　　　1,869,186

FLOAT

Filed July 20, 1931

INVENTOR
ABRAHAM E. DAVIDSON
BY
ATTORNEY

Patented July 26, 1932

1,869,186

UNITED STATES PATENT OFFICE

ABRAHAM E. DAVIDSON, OF ROCHESTER, NEW YORK

FLOAT

Application filed July 20, 1931. Serial No. 551,930.

This invention relates to aquatic toys and sport devices and is adapted for the amusement of old and young.

One of the objects of this invention is to provide a float which is simple, durable and strong in construction and may be readily assembled for use or disassembled for the purpose of carrying it in a compact form.

Another object of this invention is to provide a float which is safe and can be easily handled by any one.

Another object of this invention is to provide a float which is adjustable so that any size inner tube may be used to provide the buoyant element therefor.

Another object of this invention is to provide an adjustable frame for the float with which the circular form of an inner tube may be expanded to simulate the outline of a small boat which makes it possible to better handle and propel the float.

These and other objects of this invention will be apparent from the detailed description of one embodiment of the invention, reference being had to the accompanying drawing in which Figure 1 is a top plan view of the float.

In the several figures like reference numerals indicate like parts.

Figure 1:
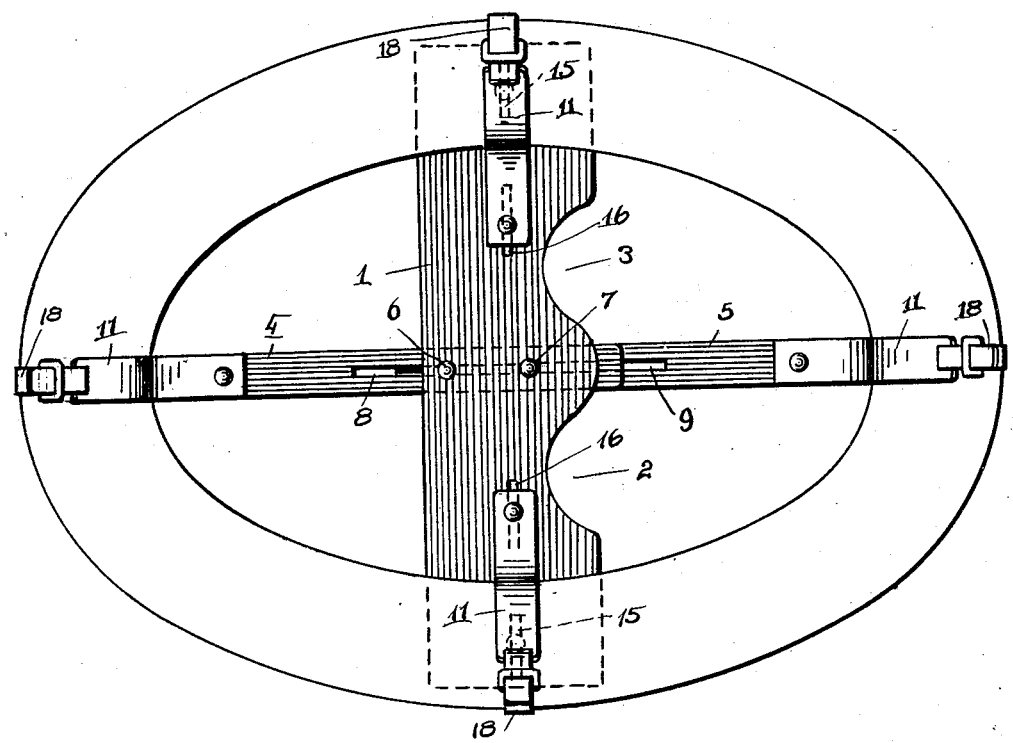
Figure 2:
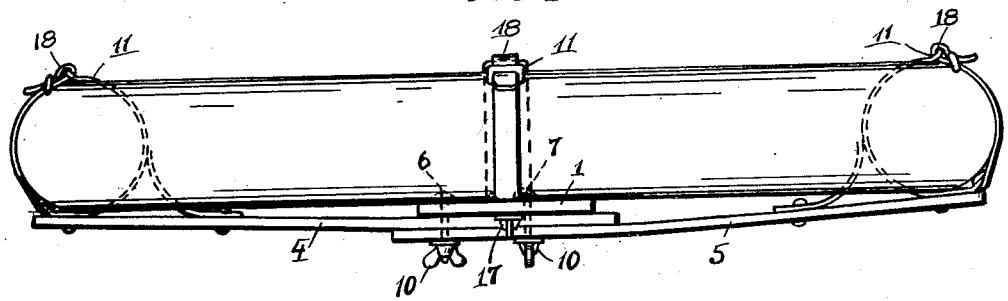
Figure 2 is a side elevation of the float.
Figure 3:
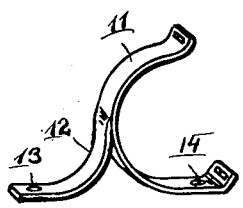
Figure 3 is a detail perspective view of one of the brackets for holding the inner tube in place on the float.

The float forming the subject matter of this invention comprises more specifically a supporting structure in the form of a seat combined with suitable adjustable brackets and an annular buoyant element, such as a discarded inner tube of an automobile tire which is removably fastened thereto and stretched into the desired shape.

Referring to the drawing reference numeral 1 designates the seat which is made up in the form of a flat board having the notches 2 and 3 provided on one side thereof. To the underside of the seat in the middle thereof are adjustably fastened the longitudinal brackets 4 and 5. For this purpose a pair of bolts 6 and 7 project thru the seat and the slots 8 and 9 provided in the brackets 4 and 5 respectively and have the thumb screws 10, 10 threaded thereon with which these brackets and the seat are clamped together.

Each of the brackets 4 and 5 has a semicircular metal strap 11 attached to the outer end of it. These straps have a rearwardly curved brace 12 at the back thereof with a hole 13 provided therein. Another hole 14 is provided in the strap near the outer end of it so that two bolts passing thru these holes and the brackets firmly anchor the straps in place on the brackets.

Two of the semicircular metal straps 11 are adjustably attached to the outer ends of the seat 1. For this purpose the seat is slotted at 15 and 16 near each end to have the bolts of the metal straps 11 pass therethru and clamp the straps in the desired position on the seat by means of the thumb screws 17 threaded on the bolts. Within a limited range the metal straps 11 can thus be adjustably clamped to the seat for a purpose that will presently appear.

As above pointed out the inner tube 17 of an automobile tire is used as the buoyant element for the float. This tube is placed into the semicircular straps 11 in its deflated condition. After the tube is located in the metal straps, the longitudinal brackets 4 and 5 are adjusted endways with relation to each other and the seat 1 for the desired length of the float, while the straps 11, 11 on the outer end of the seat are adjusted with relation to the middle of the seat for the width of the float.

All inner tubes are circular in outline and the brackets 4 and 5 can be adjusted lengthways and the metal straps 11, 11 on the seat 1 can be adjusted crossways so that all of the straps are equally spaced from the center of the float in order to hold the inner tube when inflated in its natural circular form. A circular form of float is however not as readily handled as one which is oblong with the ends thereof slightly pointed. For this reason the longitudinal brackets are preferably adjusted to stretch the circular form of the tube in front and back of the seat while the metal straps of the seat are correspondingly adjusted to allow the circular form of the tube to contract in the middle so that the tube, when inflated, will have an oblong boat shaped outline as illustrated in Figure 1 of the drawing.

It is also possible to stretch the tube into other outlines; for example, only the longitudinal bracket 5 in front of the seat may be adjusted to stretch the tube so that only the front of the float is pointed while the rear is left semicircular.

After the tube is inflated in the metal straps, flexible straps 18, one on each end of the metal straps, are drawn around the outside of the tube and suitably fastened between the ends of the metal straps to prevent the tube, after being inflated, from disengaging itself from the metal straps and securely fastening the tube to the remainder of the float. The float is used with the tube located on top of the seat and the brackets. The person using the float and seated on the seat is thus surrounded by the tube. Suspending the weight from the bottom of the tube also keeps the float steady and prevents it from tilting.

I claim:

1. A float for amusement purposes including a seat, a pair of straps adjustably mounted on said seat, a longitudinal bracket carried by said seat and an endless buoyant element extending around said bracket and the straps of said seat.

2. A float for amusement purposes including a seat, a longitudinal sectional bracket intermediate of said seat and having one section adjustably clamped to said seat, a circular elastic buoyant element surrounding the center portion of said seat and said bracket said adjustable section of said bracket being adapted to stretch said buoyant element to form a pointed end on the float by adjusting said section relative to said seat.

3. A float for amusement purposes including a seat, a pair of straps mounted on said seat near each end thereof, a pair of longitudinal brackets mounted intermediate of said seat, a strap carried by each of said brackets, an endless and elastic buoyant element encircling said straps and means for adjusting said brackets with relation to each other to stretch and give said elastic buoyant element a predetermined outline.

4. A float for amusement purposes comprising a seat, a pair of semicircular straps carried on the outer ends and above said seat, a pair of longitudinal brackets slidably mounted below said seat and extending forward and to the rear thereof, a semicircular strap carried on the outer end and above each of said longitudinal brackets, an endless and elastic buoyant element surrounding said straps and seated therein, means for locking said buoyant element into said straps and means for adjustably clamping said longitudinal brackets to said seat to hold said buoyant element expanded in a predetermined outline in front and back of said seat.

ABRAHAM E. DAVIDSON.